United States Patent
Floyd

(10) Patent No.: US 7,881,686 B2
(45) Date of Patent: Feb. 1, 2011

(54) SELECTABLE CAPACITANCE CIRCUIT

(75) Inventor: Philip D. Floyd, Redwood, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/698,907

(22) Filed: Feb. 2, 2010

(65) Prior Publication Data

US 2010/0149722 A1 Jun. 17, 2010

Related U.S. Application Data

(62) Division of application No. 11/134,222, filed on May 20, 2005, now Pat. No. 7,657,242.

(60) Provisional application No. 60/613,409, filed on Sep. 27, 2004.

(51) Int. Cl.
H04B 1/06 (2006.01)

(52) U.S. Cl. .......... 455/262; 455/550.1; 359/578; 361/277

(58) Field of Classification Search .......... 455/256, 455/257, 258, 262, 550.1; 359/578; 361/277
See application file for complete search history.

(56) References Cited

U.S. PATENT DOCUMENTS

| | | | |
|---|---|---|---|
| 4,441,791 A | 4/1984 | Hornbeck |
| 4,571,603 A | 2/1986 | Hornbeck et al. |
| 4,748,366 A | 5/1988 | Taylor |
| 4,859,060 A | 8/1989 | Katagiri et al. |
| 4,954,789 A | 9/1990 | Sampsell |
| 5,083,857 A | 1/1992 | Hornbeck |
| 5,216,537 A | 6/1993 | Hornbeck |
| 5,226,099 A | 7/1993 | Mignardi et al. |
| 5,489,952 A | 2/1996 | Gove et al. |
| 5,526,172 A | 6/1996 | Kanack |
| 5,530,240 A | 6/1996 | Larson et al. |
| 5,550,373 A | 8/1996 | Cole et al. |
| 5,551,293 A | 9/1996 | Boysel et al. |
| 5,629,521 A | 5/1997 | Lee et al. |

(Continued)

FOREIGN PATENT DOCUMENTS

EP 0 649 010 4/1995

(Continued)

OTHER PUBLICATIONS

Miles, A New Reflective FPD Technology Using Interferometric Modulation, Journal of the SID 5/4, 1997, pp. 379-382.

(Continued)

Primary Examiner—Nhan Le
(74) Attorney, Agent, or Firm—Knobbe, Martens, Olson & Bear, LLP

(57) ABSTRACT

A voltage-controlled capacitor and methods for forming the same are described. A mechanical conductor membrane of the voltage-controlled capacitor is movable to and from a first position and a second position. An amount of capacitance can vary with the movement of the mechanical conductor membrane. A microelectromechanical systems (MEMS) voltage-controlled capacitor can be used in a variety of applications, such as, but not limited to, RF switches and RF attenuators.

17 Claims, 17 Drawing Sheets

U.S. PATENT DOCUMENTS

| | | | |
|---|---|---|---|
| 5,815,141 A | 9/1998 | Phares | |
| 5,894,686 A | 4/1999 | Parker et al. | |
| 5,977,945 A | 11/1999 | Ohshima | |
| 6,040,937 A | 3/2000 | Miles | |
| 6,229,684 B1 | 5/2001 | Cowen et al. | |
| 6,242,989 B1 | 6/2001 | Barber et al. | |
| 6,295,048 B1 | 9/2001 | Ward et al. | |
| 6,304,297 B1 | 10/2001 | Swan | |
| 6,307,194 B1 | 10/2001 | Fitzgibbons et al. | |
| 6,353,353 B1 * | 3/2002 | Nakayama | 327/382 |
| 6,437,965 B1 * | 8/2002 | Adkins et al. | 361/303 |
| 6,666,561 B1 | 12/2003 | Blakley | |
| 6,670,864 B2 | 12/2003 | Hyvonen et al. | |
| 6,674,562 B1 | 1/2004 | Miles et al. | |
| 6,737,979 B1 | 5/2004 | Smith et al. | |
| 6,819,469 B1 | 11/2004 | Koba | |
| 6,829,132 B2 | 12/2004 | Martin et al. | |
| 6,965,349 B2 | 11/2005 | Livingston et al. | |
| 7,002,441 B2 | 2/2006 | Pillans et al. | |
| 7,085,121 B2 | 8/2006 | Lynch et al. | |
| 7,123,216 B1 | 10/2006 | Miles | |
| 7,126,447 B2 | 10/2006 | Kawai | |
| 7,138,984 B1 | 11/2006 | Miles | |
| 7,151,320 B2 | 12/2006 | Shizuno | |
| 7,202,885 B2 | 4/2007 | Motohashi | |
| 7,280,265 B2 | 10/2007 | Miles | |
| 7,620,121 B1 * | 11/2009 | Tetzlaff et al. | 375/319 |
| 2001/0054937 A1 | 12/2001 | Hyvonen et al. | |
| 2002/0075555 A1 | 6/2002 | Miles | |
| 2002/0171517 A1 | 11/2002 | Guo et al. | |
| 2003/0112507 A1 | 6/2003 | Divelbiss et al. | |
| 2003/0117382 A1 | 6/2003 | Pawlowski et al. | |
| 2003/0122079 A1 | 7/2003 | Pobanz et al. | |
| 2003/0128197 A1 | 7/2003 | Turner et al. | |
| 2003/0146079 A1 | 8/2003 | Goldsmith et al. | |
| 2003/0173504 A1 | 9/2003 | Cole et al. | |
| 2004/0024580 A1 | 2/2004 | Salmonsen et al. | |
| 2004/0054490 A1 | 3/2004 | Bradley et al. | |
| 2005/0001797 A1 | 1/2005 | Miller et al. | |
| 2005/0068254 A1 | 3/2005 | Booth | |
| 2005/0134962 A1 | 6/2005 | Verghese | |
| 2005/0254195 A1 * | 11/2005 | Nakayama | 361/277 |
| 2006/0009185 A1 * | 1/2006 | Shamsaifar et al. | 455/278.1 |
| 2006/0052144 A1 | 3/2006 | Seil et al. | |
| 2007/0023851 A1 | 2/2007 | Hartzell et al. | |
| 2007/0247406 A1 | 10/2007 | Zhou et al. | |
| 2010/0002408 A1 * | 1/2010 | Andersson et al. | 361/821 |

FOREIGN PATENT DOCUMENTS

| | | |
|---|---|---|
| EP | 0 725 380 | 8/1996 |
| JP | 08-213282 | 8/1996 |
| JP | 09-082569 | 3/1997 |
| JP | 2004-172504 | 6/2004 |
| WO | WO 03/036668 | 5/2003 |
| WO | WO 2004/066256 | 8/2004 |
| WO | WO 2005/066596 | 7/2005 |

OTHER PUBLICATIONS

Mark W. Miles, "MEMS-based interferometric modulator for display applications," Proceedings of SPIE, vol. 3876, Aug. 1999, pp. 20-28.

Miles et al., 10.1: Digital Paper™ for reflective displays, SID 02 Digest, pp. 115-117, 2002.

Winton, John M., A novel way to capture solar energy, Chemical Week, pp. 17-18 (May 15, 1985).

Wu, Design of a Reflective Color LCD Using Optical Interference Reflectors, ASIA Display '95, pp. 929-931 (Oct. 16, 1995).

Office Action dated Dec. 18, 2008 in U.S. Appl. No. 11/216,955.

Office Action dated May 7, 2009 in U.S. Appl. No. 11/216,955.

Notification of Reasons for Rejection dated Aug. 28, 2007, in Japanese App. No. 2005-275828.

Notification of Reasons for Rejection dated Feb. 17, 2009, in Japanese App. No. 2005-275828.

Office Action dated Dec. 27, 2007 in U.S. Appl. No. 11/134,222.

Office Action dated Jul. 11, 2008 in U.S. Appl. No. 11/134,222.

Office Action dated Dec. 31, 2008 in U.S. Appl. No. 11/134,222.

Office Action dated Jun. 5, 2009 in U.S. Appl. No. 11/216,955.

Decision of Rejection dated Feb. 9, 2010, in Japanese App. No. 2005-275828.

Office Action dated Jun. 26, 2009 in Chinese App. No. 200510105832.0.

Office Action dated Feb. 5, 2010 in Chinese App. No. 200510105832.0.

Brank et al., Sep. 2001, RF MEMS-based tunable filters, International Journal of RF and Microwave Computer-Aided Engineering, 11(5):276-284.

Goldsmith et al., Jul. 1999, RF MEMs variable capacitors for tunable filters, International Journal of RF and Microwave Computer-Aided Engineering, 9(4):362-374.

Partial European Search Report dated Jun. 7, 2010 for App. No. 05255643.8.

Extended European Search Report dated Sep. 22, 2010 for App. No. 05255643.8.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Release | Actuate |
| $-\Delta V$ | Actuate | Release |

SELECTABLE CAPACITANCE CIRCUIT

CROSS-REFERENCE TO RELATED APPLICATIONS

This application is a divisional of U.S. patent application Ser. No. 11/134,222 titled "SELECTABLE CAPACITANCE CIRCUIT," filed on May 20, 2005, which claims the benefit under 35 U.S.C. §119(e) of U.S. Provisional Application No. 60/613,409, filed Sep. 27, 2004. The above-referenced applications are hereby incorporated by reference in their entireties.

BACKGROUND

1. Field of the Invention

The invention generally relates to microelectromechanical systems (MEMS).

2. Description of the Related Art

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. These MEMS devices can be used in a variety of applications, such as in optical applications and in electrical circuit applications.

One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

Another type of MEMS device is used as a multiple-state capacitor. For example, the capacitor can comprise a pair of conductive plates with at least one plate capable of relative motion upon application of an appropriate electrical control signal. The relative motion changes the capacitance of the capacitor, permitting the capacitor to be used in a variety of applications, such as a filtering circuit, tuning circuit, phase-shifting circuit, an attenuator circuit, and the like.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

A microelectromechanical systems (MEMS) voltage-controlled capacitor and methods for forming the same are described. A mechanical conductor membrane of the voltage-controlled capacitor is movable to and from a first position and a second position. An amount of capacitance can vary with the movement of the mechanical conductor membrane. A MEMS voltage-controlled capacitor can be used in a variety of applications, such as, but not limited to, RF switches and RF attenuators.

An attenuator or a switch fabricated from a MEMS device advantageously exhibits relatively wide-bandwidth operation with relatively low-loss and superior RF characteristics in comparison to diode and FET switches. Further, these MEMS devices can also feature relatively low drive power and relatively low series resistance where used in coplanar waveguides.

One embodiment includes a MEMS capacitor with posts disposed between anchoring points of the membrane. The spacing of the posts can determine a pull-in voltage used to change the position of the membrane. A capacitor can be formed with one or more membranes having varying post spacing. This permits the pull-in voltage to vary for corresponding portions of membranes, thereby permitting the selective actuation of membranes or portions thereof. Accordingly, the amount of capacitance can vary at least partially in response to the control voltage.

One embodiment includes a capacitor with multiple membranes that are coupled to separate control biases. This permits the independent control of the multiple membranes, thereby allowing a relatively large range of capacitance to be selected. For example, the multiple membranes can be weighted in binary weights (powers of 2) to provide near linear selection of capacitance.

BRIEF DESCRIPTION OF THE DRAWINGS

These drawings (not to scale) and the associated description herein are provided to illustrate embodiments and are not intended to be limiting.

DETAILED DESCRIPTION OF PREFERRED EMBODIMENTS

Although particular embodiments are described herein, other embodiments, including embodiments that do not provide all of the benefits and features set forth herein, will be apparent to those of ordinary skill in the art.

A selectable capacitance circuit can be used in a wide variety of applications. For example, the selectable capacitance circuit can be used in an RF attenuator or in an RF switch. The selectable capacitance can be used to select an amount of RF attenuation, to select an amount of impedance mismatch for an RF switch, and the like. An attenuator or a switch fabricated from a MEMS device advantageously exhibits relatively wide-bandwidth operation with relatively low-loss and superior RF characteristics in comparison to diode and FET switches. MEMS devices also typically require relatively low drive power and can exhibit relatively low series resistance.

While generally described with reference to FIGS. 1 to 6C in the context of an interferometric modulator display, the skilled artisan will appreciate that the principles of the relative movement of one or both of the conductive plates or membranes of a MEMS device for a display will also be applicable to a MEMS capacitor.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
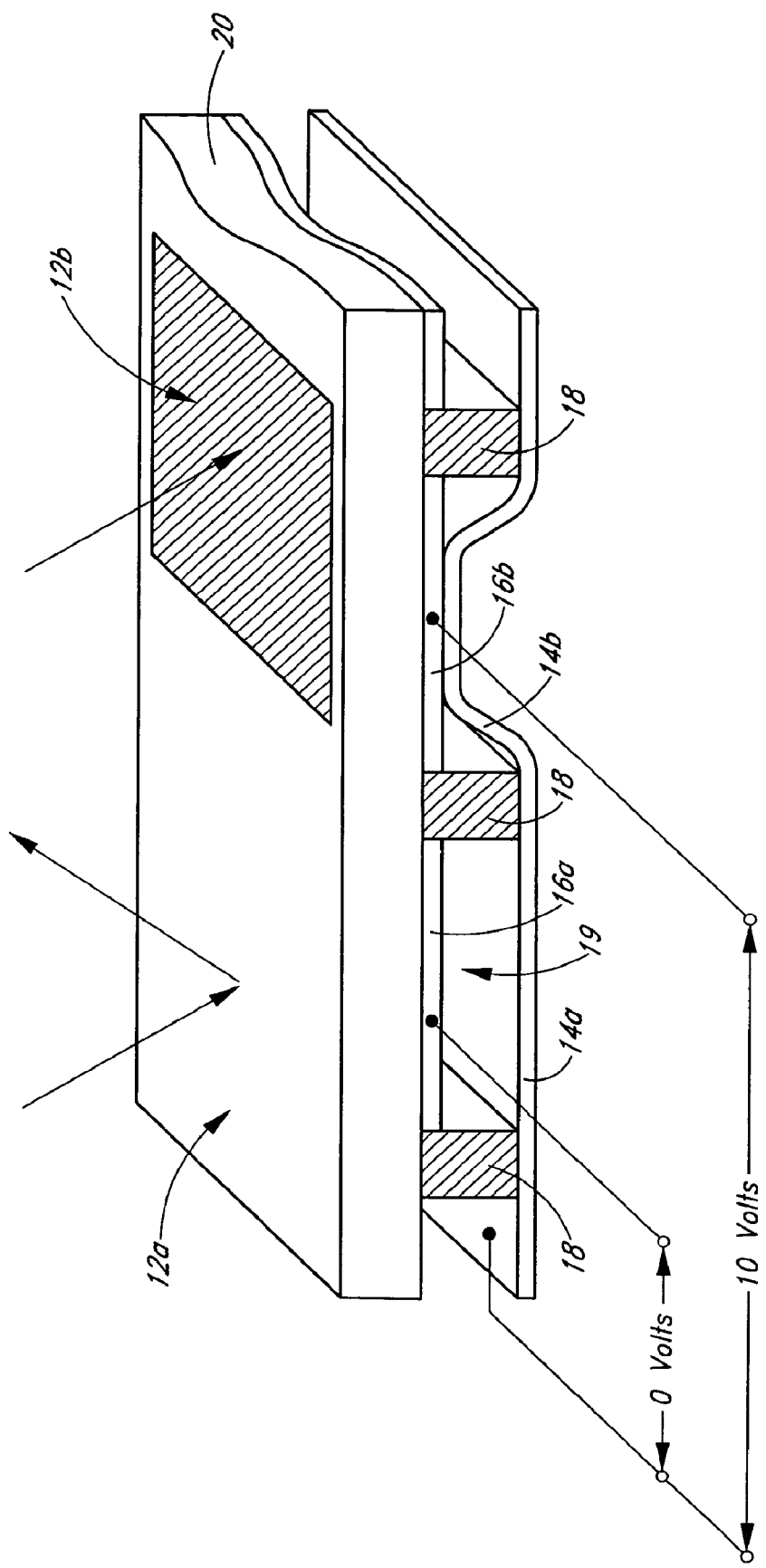
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
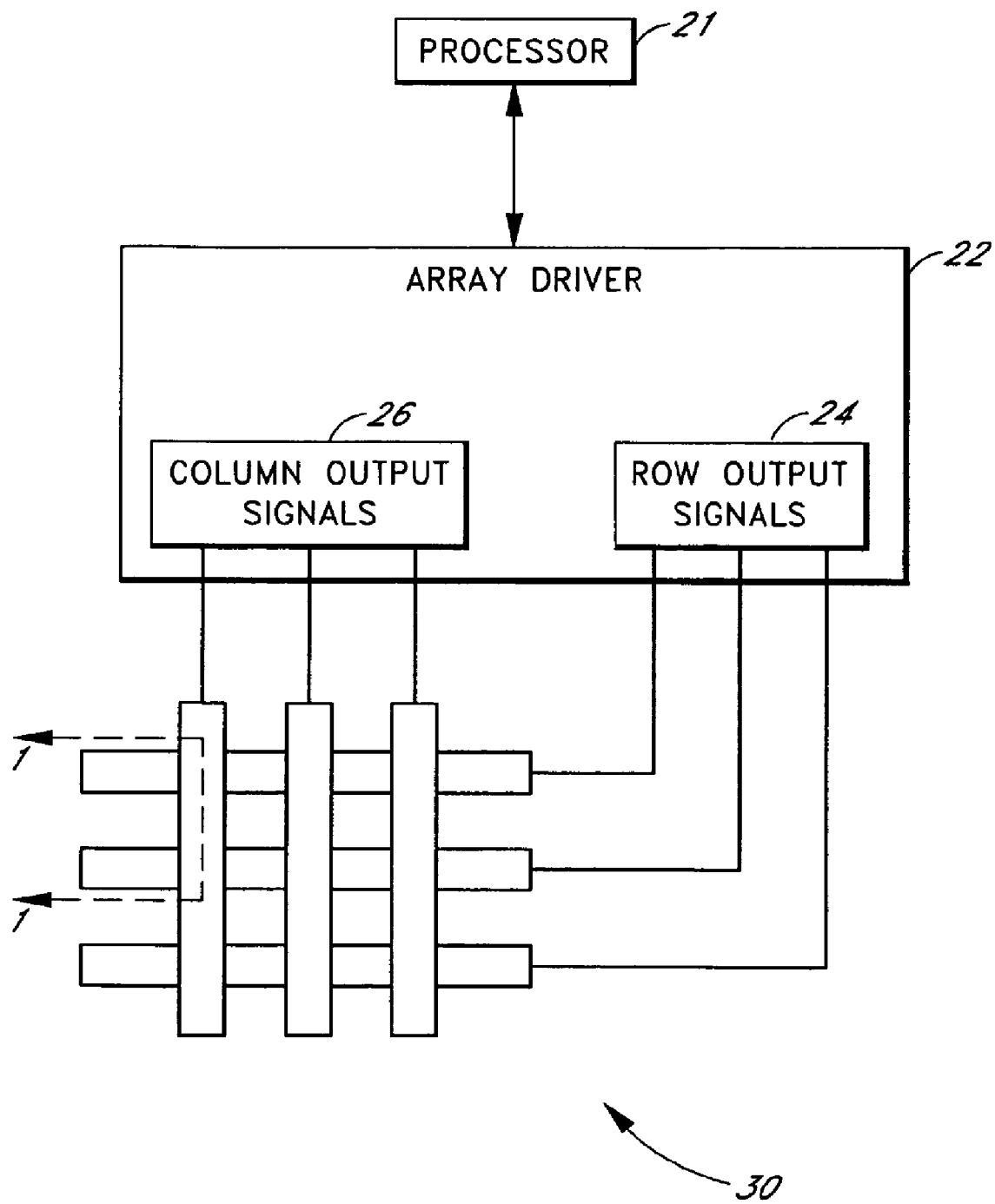
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
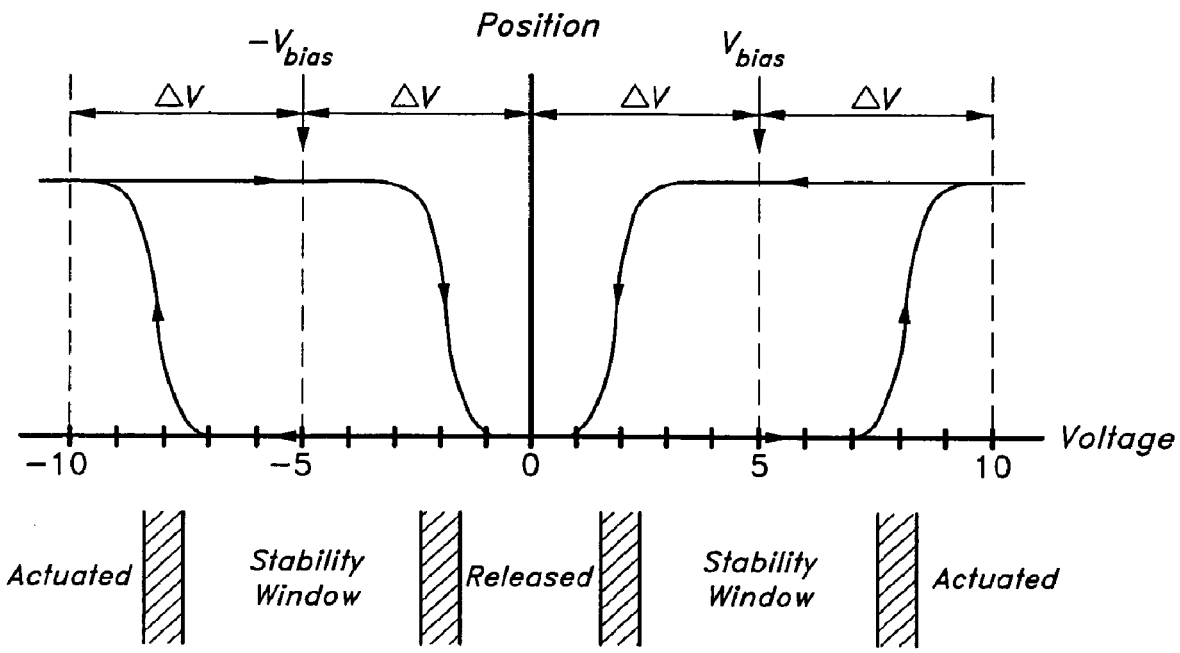
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
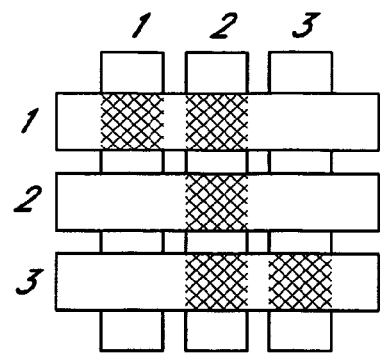
FIGS. 5A and 5B illustrate one exemplary timing diagram for row and column signals that may be used to write a frame of display data to the 3×3 interferometric modulator display of FIG. 2.
Figure 5B:
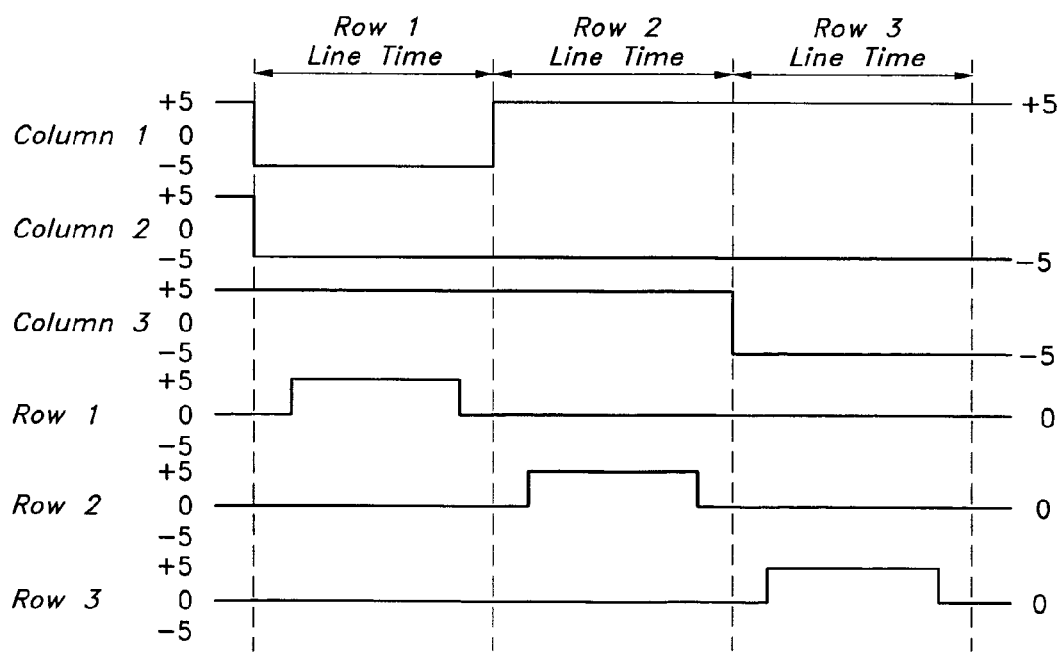

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
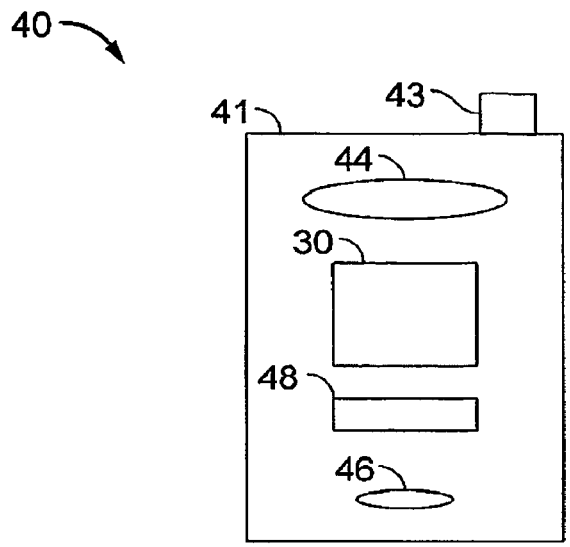
FIGS. 6A and 6B are system block diagrams illustrating an embodiment of a display device 40.
Figure 6B:
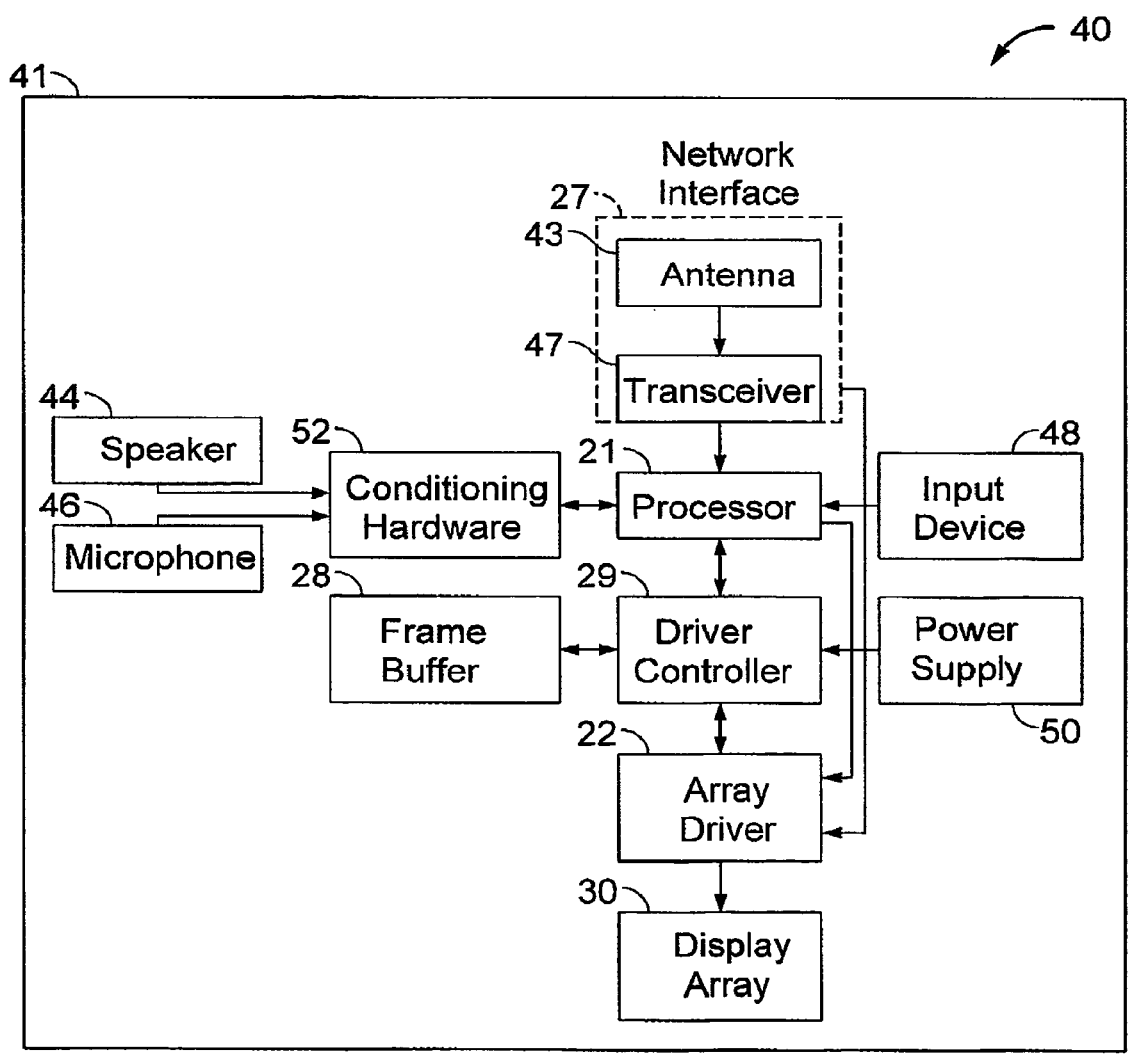

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. [The conditioning hardware 52 may be configured to condition a signal (e.g. filter a signal).] The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
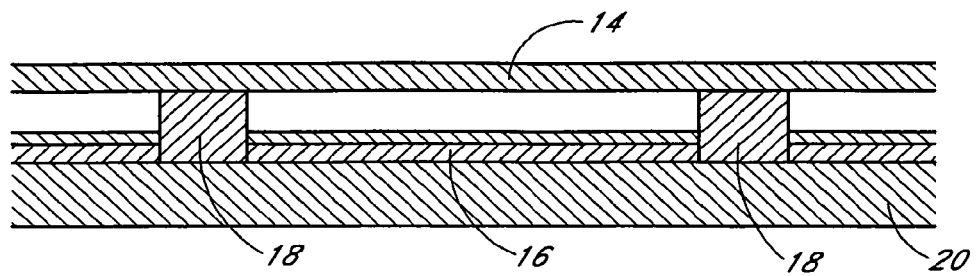
FIG. 7A is a cross section of the device of FIG. 1.
Figure 7B:
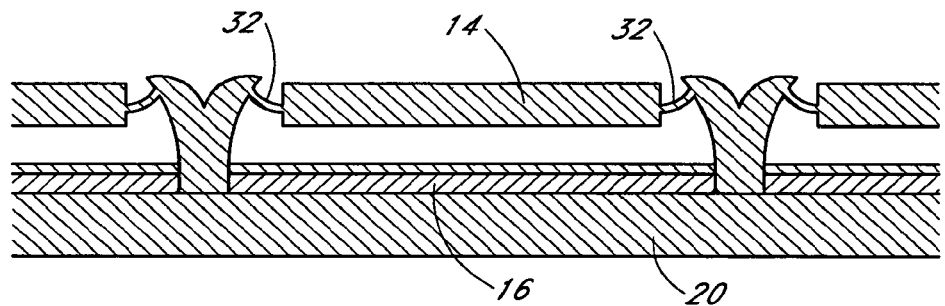
FIG. 7B is a cross section of an alternative embodiment of an interferometric modulator.
Figure 7C:
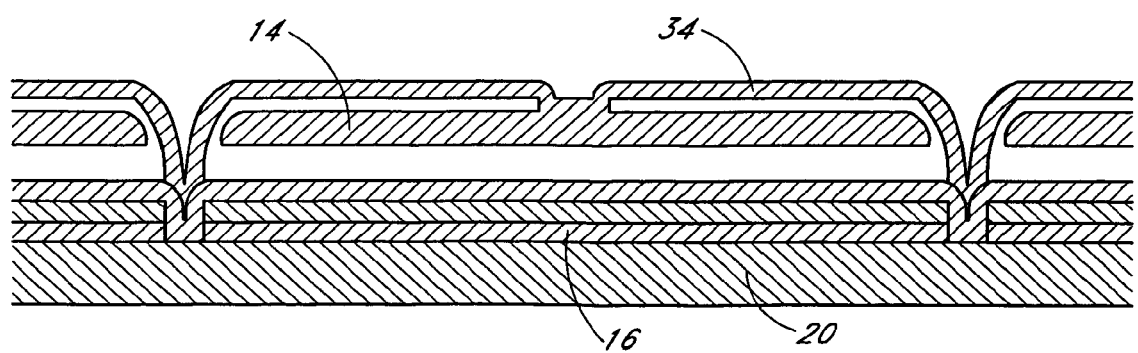
FIG. 7C is a cross section of another alternative embodiment of an interferometric modulator.

The details of the structure of interferometric modulators that operate in accordance with the principles set forth above may vary widely. For example, FIGS. 7A-7C illustrate three different embodiments of the moving mirror structure. FIG. 7A is a cross section of the embodiment of. FIG. 1, where a strip of metal material 14 is deposited on orthogonally extending supports 18. In FIG. 7B, the moveable reflective material 14 is attached to supports at the corners only, on tethers 32. In FIG. 7C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

Figure 7D:
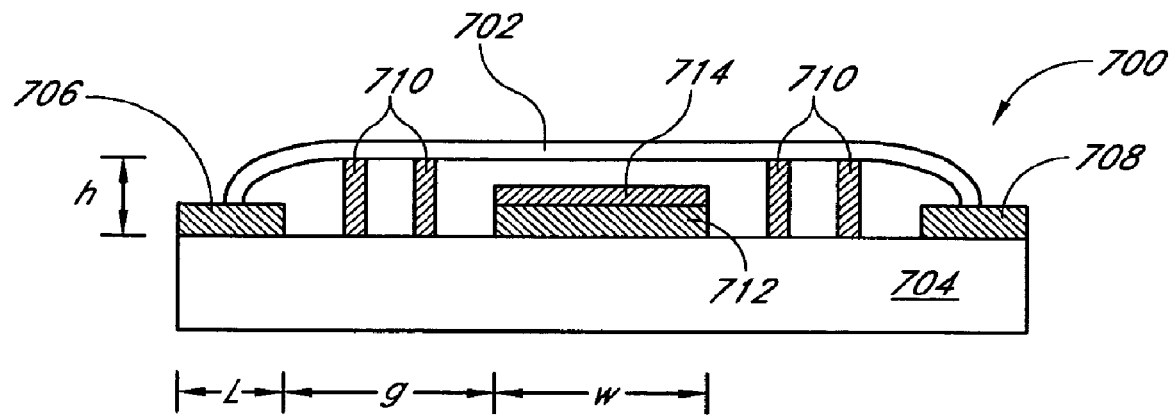
FIG. 7D illustrates a cross-sectional side view of a MEMS capacitor with a mechanical conductor membrane in a low-capacitance position.
Figure 7E:
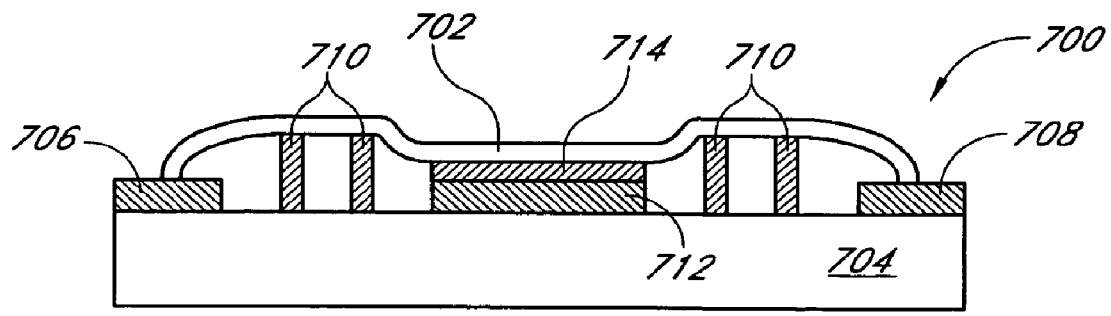
FIG. 7E illustrates a cross-sectional side view of the MEMS capacitor of FIG. 7D with the mechanical conductor membrane in a high-capacitance position.

FIG. 7D illustrates a cross-sectional side view of a MEMS capacitor 700 with a mechanical conductor membrane 702 in a low capacitance position. FIG. 7E illustrates the same MEMS capacitor 700 in a high capacitance position. One process for fabricating the MEMS capacitor 700 will be described later in connection with FIGS. 13A to 13I. The MEMS capacitor 700 also includes a substrate assembly 704, voltage reference lines 706, 708, posts 710, a signal conductor 712, and a layer of dielectric material 714 disposed on the signal conductor 712.

In the illustrated embodiment, the voltage reference lines 706, 708 and the signal conductor 712 are formed on the substrate assembly 704 in a coplanar waveguide configuration. It will be understood that other structures, such as barrier layers, can also be present. The substrate assembly 704 can be formed from a variety of materials, such as glass, silicon, gallium arsenide, lithium niobate, indium phosphide, and the like. It should be noted that unlike the materials that should be used in an interferometric modulator for a display application, the materials used for the substrate assembly 704, the voltage reference lines 706, 708, and the signal conductor 712 do not need to be selected for relatively good transparency. Rather, the materials can be selected based on electrical performance characteristics, cost, and the like. Examples of materials that can be used for the voltage reference lines 706, 708 and for the signal conductor 712 include silver, copper, gold, aluminum, or combinations thereof. In one embodiment, the material used for the voltage reference lines 706, 708 and for the signal conductor 712 is the same. The selected material is preferably a relatively good conductor, such as a material having a resistivity of less than $1 \times 10^{-6}$ ohm-meters ($\Omega$-m) or even more preferably, less than $0.1 \times 10^{-6}$ ohm-meters ($\Omega$-m).

The voltage reference lines 704, 706 provide a signal ground reference for the signal carried by the signal conductor 712. The signal ground should provide a relatively low impedance to ground for RF signals. It will be understood that such a signal ground can be, but does not have to be, at DC ground potential. In the embodiment illustrated in FIGS. 7D and 7E, the voltage reference lines 706, 708, and the mechanical conductor membrane 702 are at the same DC potential. In an embodiment that will be described later in connection with FIG. 8, different DC potentials can be used.

The signal conductor 712 carries the signal for which a selectable capacitance is provided. For example, the selectable capacitance can be used in an RF attenuator to select an amount of attenuation applied to the signal, can be used in an RF switch to select a path for the signal, and the like. A coupling capacitor can be used to isolate the RF signal from a control voltage that is also carried by the signal conductor 712. The control voltage can at least partially control the position of the mechanical conductor membrane 702 as described earlier in connection with FIG. 3.

In the illustrated embodiment, the layer of dielectric material 714 is formed on the signal conductor 712. In another embodiment, the layer of dielectric material 714 can be disposed on the bottom side (side facing the signal conductor 712) of the mechanical conductor membrane 702. A variety of materials can be used for the layer of dielectric material 714, such as, for example, silicon oxide, silicon nitride, and the like. The layer of dielectric material 714 prevents the mechanical conductor membrane 702 and the signal conductor 712 from electrically shorting when in the low capacitance position illustrated in FIG. 7E.

The mechanical conductor membrane 702 should also be formed from a conductive material. A wide variety of materials can be used. For example, the same materials used for the voltage reference lines 706, 708 and for the signal conductor 712 can be used. In addition, the mechanical conductor membrane 702 can also be formed from multiple layers of various materials selected to provide relatively good electrical and mechanical properties, such as stress.

Posts 710 can be formed from a variety of materials (conductive or dielectric), such as from polymers, metals, glasses, ceramics, and the like. In one embodiment, the posts 710 are formed from a photo-sensitive polymer for ease of fabrication. The posts 710 support on the mechanical conductor membrane 702 such that in the low capacitance position, the mechanical conductor membrane 702 is a height h above a surface of the substrate. The height of the posts 710 (also h), the spacing between posts 710, and the tensile stress on the mechanical conductor membrane 702 can be used to select an appropriate pull-in voltage for the mechanical conductor membrane 702.

It will be understood by the skilled practitioner that the appropriate materials and dimensions to use for a particular MEMS capacitor 700 will depend on a variety of considerations such as cost, electrical performance requirements (such as frequency range), available size, desired pull-in voltages, and the like. In one embodiment, an appropriate thickness for the conductors for the voltage reference lines 706, 708 and for the signal conductor 712 is in a range of about 0.5 to 5 micrometers. An appropriate width w for the signal conductor 712 is in a range of about 25 micrometers to about 75 micrometers. An appropriate width L for the voltage reference lines 706, 708 is in a range of about 50 micrometers to about 250 micrometers. An appropriate distance g between one of the voltage reference lines 706, 708 and the signal conductor 712 is in a range of about 10 micrometers to about 50 micrometers. In one embodiment, an appropriate thickness for the layer of dielectric material 714 is in a range of about 0.1 to 0.5 micrometers. Other appropriate dimensions will be readily determined by one of ordinary skill in the art.

The mechanical conductor membrane 702 can move to and from a first position and a second position. As illustrated in FIG. 7D, there is a gap between the bottom of the mechanical conductor membrane 702 and the layer of dielectric material 714. The presence of this gap provides the MEMS capacitor 700 with relatively low capacitance in the position illustrated in FIG. 7D. When activated by an appropriate pull-in voltage between the mechanical conductor membrane 702 and the signal conductor 712, the mechanical conductor membrane 702 moves to a higher capacitance position as illustrated in FIG. 7E.

Figure 8:
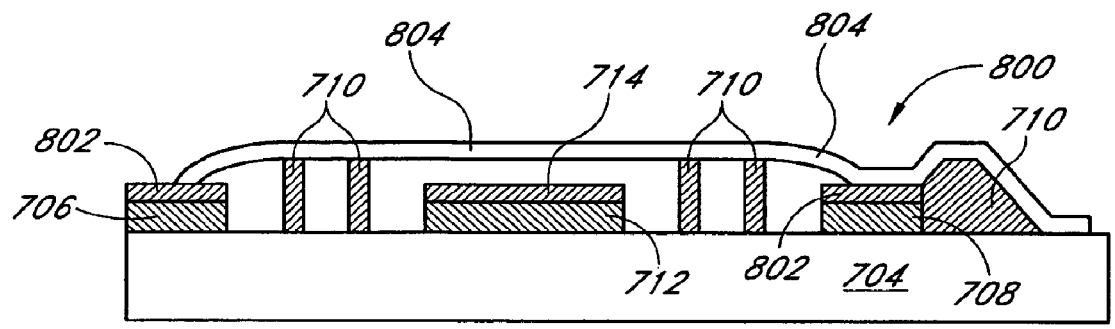
FIG. 8 illustrates a cross-sectional side view of a MEMS capacitor according to one embodiment where the membrane is insulated from a voltage reference.

FIG. 8 illustrates a cross-sectional side view of a MEMS capacitor 800 according to one embodiment where a layer of dielectric material 802 insulates a mechanical conductor membrane 804 from a voltage reference. The layer of dielectric material 802 is disposed between the mechanical conductor membrane 804 and voltage reference lines 706, 708. This permits the voltage reference lines 706, 708 to be at a different DC electric potential than the mechanical conductor membrane 804. The mechanical conductor membrane 802 can be extended to contact a source for the DC bias as shown to the right of FIG. 8. It should be noted that one of or both voltage reference lines 706, 708 should still be coupled to a relatively good signal ground.

A wide variety of materials can be used for the layer of dielectric material 802. For example, the layer of dielectric material 802 can be formed from aluminum oxide, silicon oxide, silicon nitride, and the like. In one embodiment, the voltage reference line 708 is coupled to a DC ground, and the mechanical conductor membrane 804 is coupled to a DC bias relative to the bias on the signal conductor 712 for actuation of the position of the mechanical conductor membrane 804. This can permit, for example, DC isolated sections of a mechanical conductor membrane to be selectively activated or moved, thereby providing a relatively wide range of selectable capacitance. This can be useful in an RF attenuation application. In one example, the signal conductors and the mechanical conductor membranes are arranged in rows and columns and activated as described earlier in connection with FIGS. 5A and 5B.

Figure 9A:
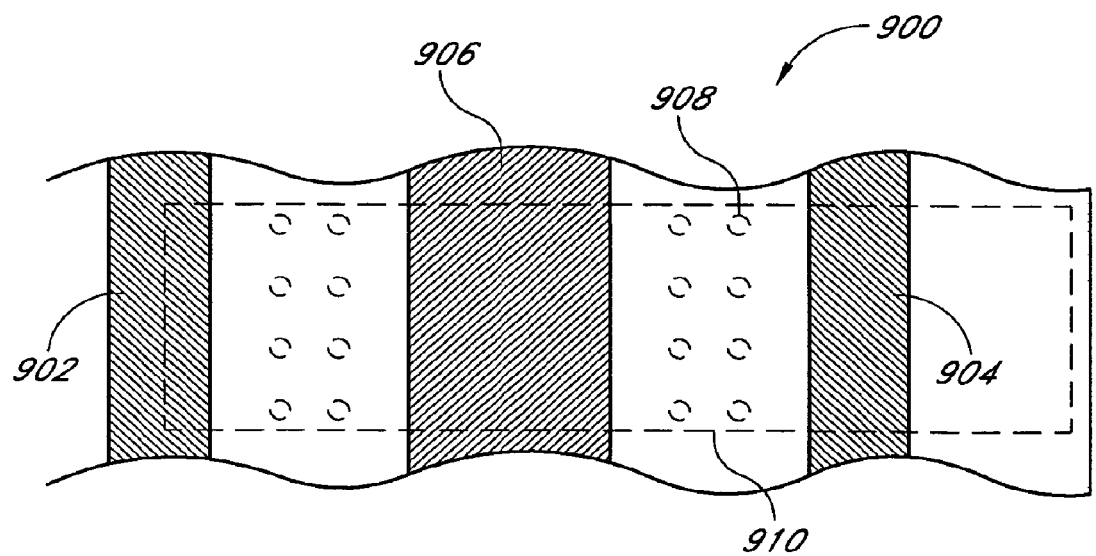
FIG. 9A illustrates a top view of an embodiment of a MEMS capacitor with a relatively uniform post spacing for the membrane.

FIG. 9A illustrates a top view of an embodiment of a MEMS capacitor 900 having a relatively uniform post spacing. For example, the top view of the MEMS capacitor 900 can correspond to the MEMS capacitor 800 described earlier in connection with FIG. 8. The illustrated portions of the MEMS capacitor 900 include voltage reference lines 902, 904, signal conductor 906, and posts 908. A dashed box 910 indicates a top view of the mechanical conductor membrane. In the illustrated embodiment, the dashed box 910 is drawn extending beyond the voltage reference line 904 for coupling to a source of a DC potential for biasing of the mechanical conductor membrane.

In one embodiment, where the capacitor is embodied in an RF attenuator or in an RF switch in a coplanar waveguide configuration, the RF signal can flow across the capacitor such that an RF input signal and an RF output signal can be coupled to terminals at opposing ends of the signal conductor 906. Such coupling can be, for example, via a coupling capacitor or other coupling that does not pass DC from a source of a control voltage.

With relatively consistent or uniform spacing, the movable portion of the mechanical conductive membrane can be expected to move from one position to another substantially simultaneously.

Figure 9B:
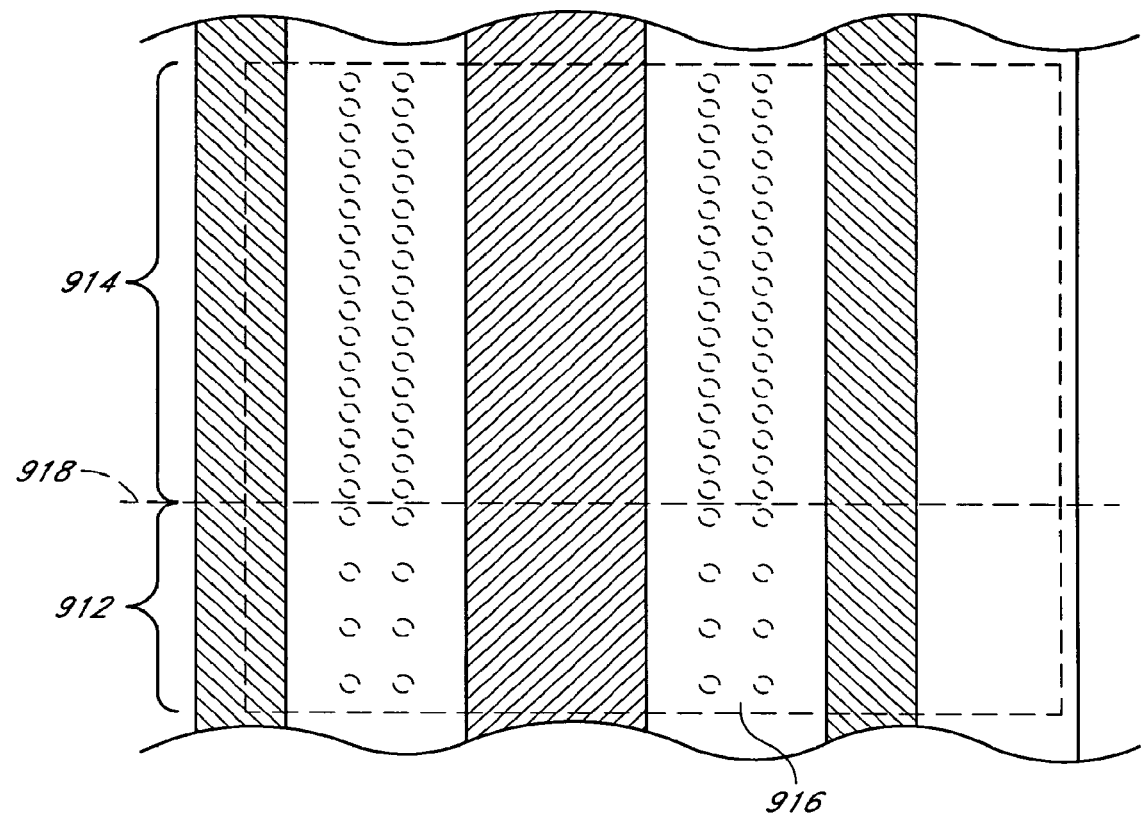
FIG. 9B illustrates a top view of an embodiment of a MEMS capacitor with relatively wide post spacing for a first portion of the membrane and a relatively tight post spacing for a second portion of the membrane.

FIG. 9B illustrates a top view of an embodiment of a MEMS capacitor with relatively wide post spacing for a first portion 912 of the mechanical conductor membrane 916 and a relatively tight post spacing for a second portion 914 of the mechanical conductor membrane 916. A dashed line 918 is drawn approximately between the two portions.

It should be noted that although the mechanical conductor membrane 916 is in one piece such that the first portion 912 and the second portion 914 are portions of the same mechanical conductor membrane 916, the first portion 912 and the second portion 914 can independently move. By varying the heights (not shown) and/or the spacing between the posts, the pull-in voltage required can vary between the different portions. For example, with the same height for both the first portion 912 and the second portion 914, the first portion 912 will pull in at a lower actuation voltage than the second portion 914.

Although two portions are shown in FIG. 9B, it will be understood that more portions, such as 3, 4, or more can be used. In one embodiment, the posts beneath the multiple portions of a mechanical conductor membrane 916 are arranged according to the desired selectability in capacitance.

Figure 9C:
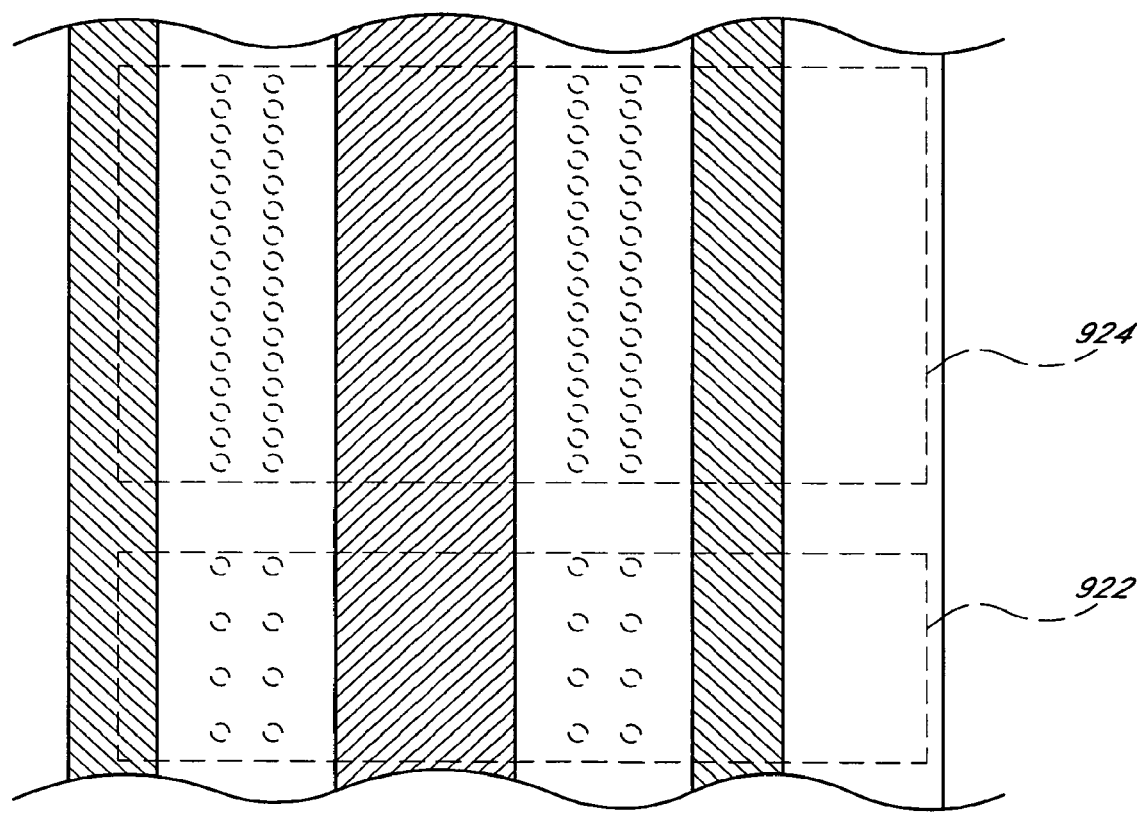
FIG. 9C illustrates a top view of an embodiment of a MEMS capacitor with two separate membranes and with different post spacing for each membrane.

FIG. 9C illustrates a top view of an embodiment of a MEMS capacitor with two separate membranes 922, 924 and with different post spacing for each membrane. For example, while the separate membranes 922, 924 can be tied to the same DC bias provided by common voltage reference lines, the membranes 922, 924 can actuate at different pull-in voltages thereby providing multiple selectivity of capacitance values. It will be understood that additional separate membranes can also be provided to provide additional selectability of capacitance.

Figure 9D:
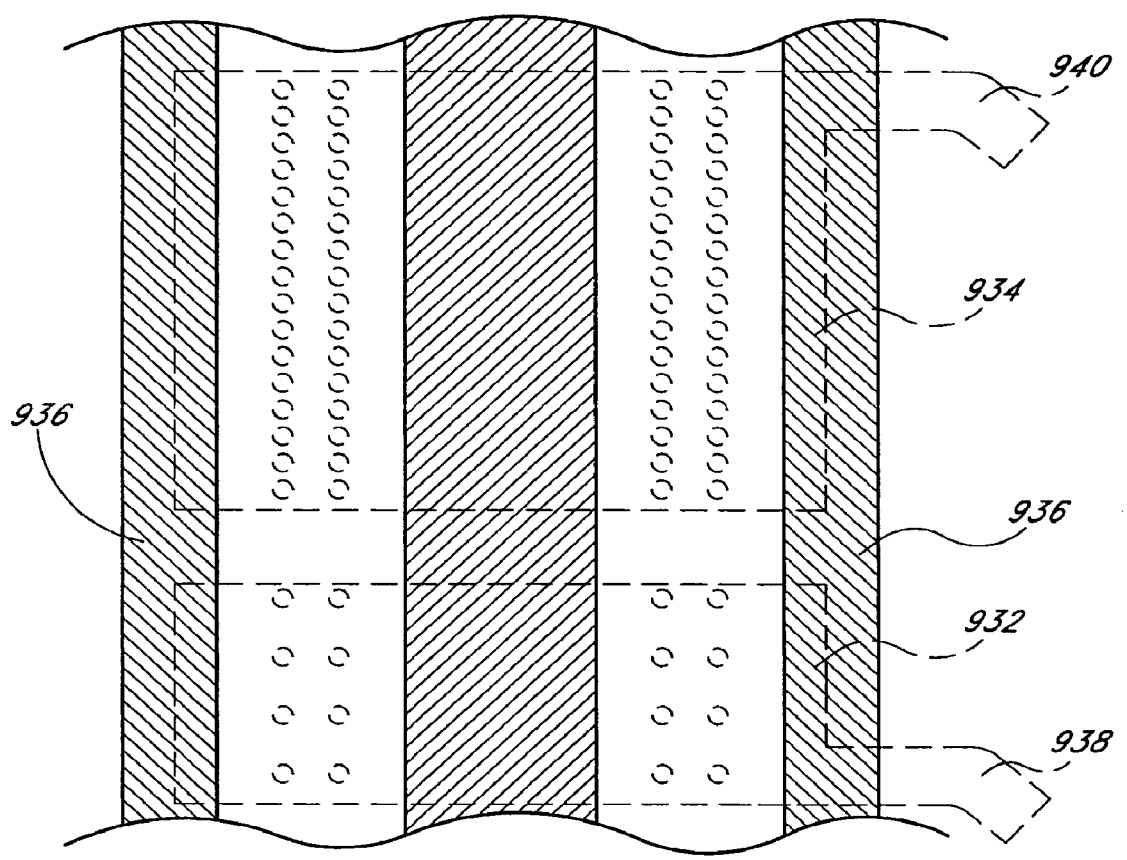
FIG. 9D illustrates a top view of an embodiment of a MEMS capacitor with two separate membranes and the same post spacing for each of the illustrated membranes.

FIG. 9D illustrates a top view of an embodiment of a MEMS capacitor with two separate mechanical conductor membranes 932, 934 and the same post spacing for the illustrated mechanical conductor membranes. This configuration can provide additional control over the configurations described earlier in connection with FIGS. 9B and 9C.

By using separate control biases on each of the illustrated mechanical conductor membranes 932, 934, each of the membranes 932, 934 can be independently pulled-in. These separate control biases are in addition to the control bias on the signal conductor. It will be understood that one of the separate control biases can correspond to ground. This increases the selectability provided by the capacitor. For example, the different mechanical conductor membranes 932, 934 can be binary-weighted, that is, approximately in powers of two by area. This can permit the amount of capacitance to be nearly linearly controlled. It should be noted that it may be necessary in some situations to move the membranes 932, 934 back to a low capacitance position between selected capacitance values. While illustrated in the context of two separate membranes 932, 934, the skilled practitioner will appreciate that additional numbers of membranes can be used.

The separate membranes 932, 934 can be isolated from each other's control voltage. For example, the configuration described earlier in connection with FIG. 8 illustrates such an isolation technique with the layer of dielectric material 802. With reference to FIG. 9D, a dielectric layer 936 can isolate one or more of the membranes 932, 934 from a direct current path with the underlying voltage reference lines, while still providing the membranes 932, 934 with a relatively good signal ground. In the illustrated embodiment, the dielectric layer 936 is shown disposed between each of the underlying voltage reference lines.

The membranes 932, 934 are coupled to a respective voltage source, which can include, for example, a DC bias, a ground reference, or a controlled or switched signal. For example, a voltage source can be coupled to a corresponding membrane using a variety of interconnection techniques, such as routing via a pad, an air bridge, and the like. For example, selected portions 938, 940 of the membranes 932, 934 can be formed at the same time as forming of the membranes 932, 934. In one embodiment, a MEMS capacitor combining DC control and varying post spacing for the mechanical conductor membrane can also be used.

Figure 10A:
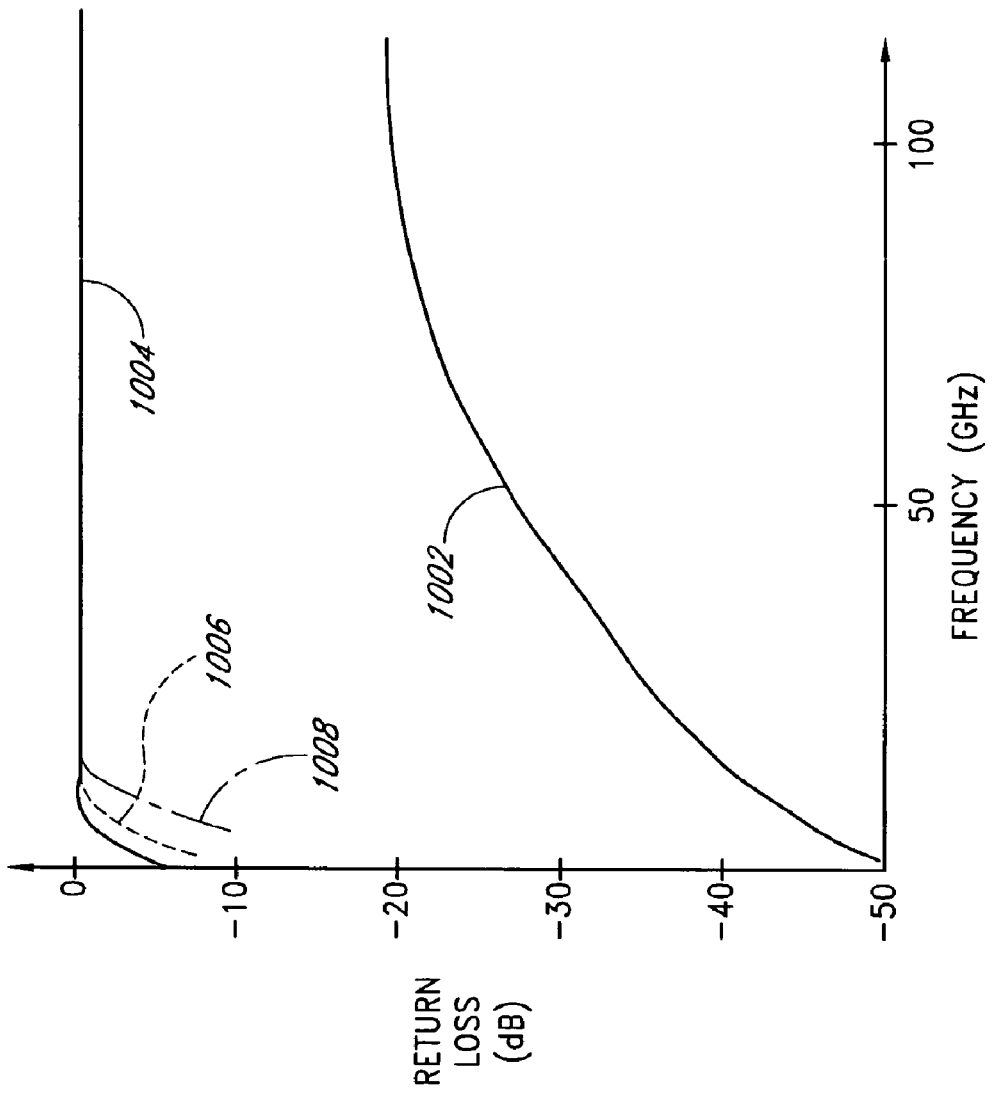
FIG. 10A illustrates an example of an expected return loss for an RF attenuator using a MEMS capacitor.

FIG. 10A illustrates an example of an expected return loss for an RF attenuator using a MEMS capacitor. For example, as described earlier in connection with FIG. 9A, an RF signal can be configured to flow across the MEMS capacitor. A horizontal axis indicates frequency with increasing frequency to the right. A vertical axis indicates return loss. The return loss corresponds to a ratio of an amplitude of the reflected wave to an amplitude of an incident wave and in FIG. 10A, the ratio is further represented in decibels. As illustrated in FIG. 10A, trace 1002 corresponds to the expected return loss of the RF attenuator with the attenuator in an "off" position, that is, when the mechanical conductor membrane 702 is in the low capacitance position illustrated for example in FIG. 7D. As illustrated by the trace 1002, the expected return loss is relatively low when the attenuator is "off," so that the RF signal passes through the RF attenuator with the MEMS capacitor with relatively low attenuation.

Other traces 1004, 1006, 1008 correspond to the return loss of the RF attenuator with the MEMS capacitor wherein the mechanical conductor membrane 702 is "pulled in" to a relatively high capacitance position as illustrated for example in FIG. 7E. The other traces 1004, 1006, 1008 vary with respect to an amount of capacitance used in the estimation. It will be understood that the amounts of capacitance can vary depending on the geometry of a capacitor and/or for a capacitor having multiple portions or multiple separate membranes that can be at least partially independently actuated, for the amount of capacitance selected. For example, the capacitance corresponding to trace 304 is greater than that used for trace 306, which in turn is greater than the capacitance used for the trace 308. As illustrated in the example, the return loss of the attenuator at relatively low frequencies can vary with the amount of capacitance exhibited by the attenuator.

Figure 10B:
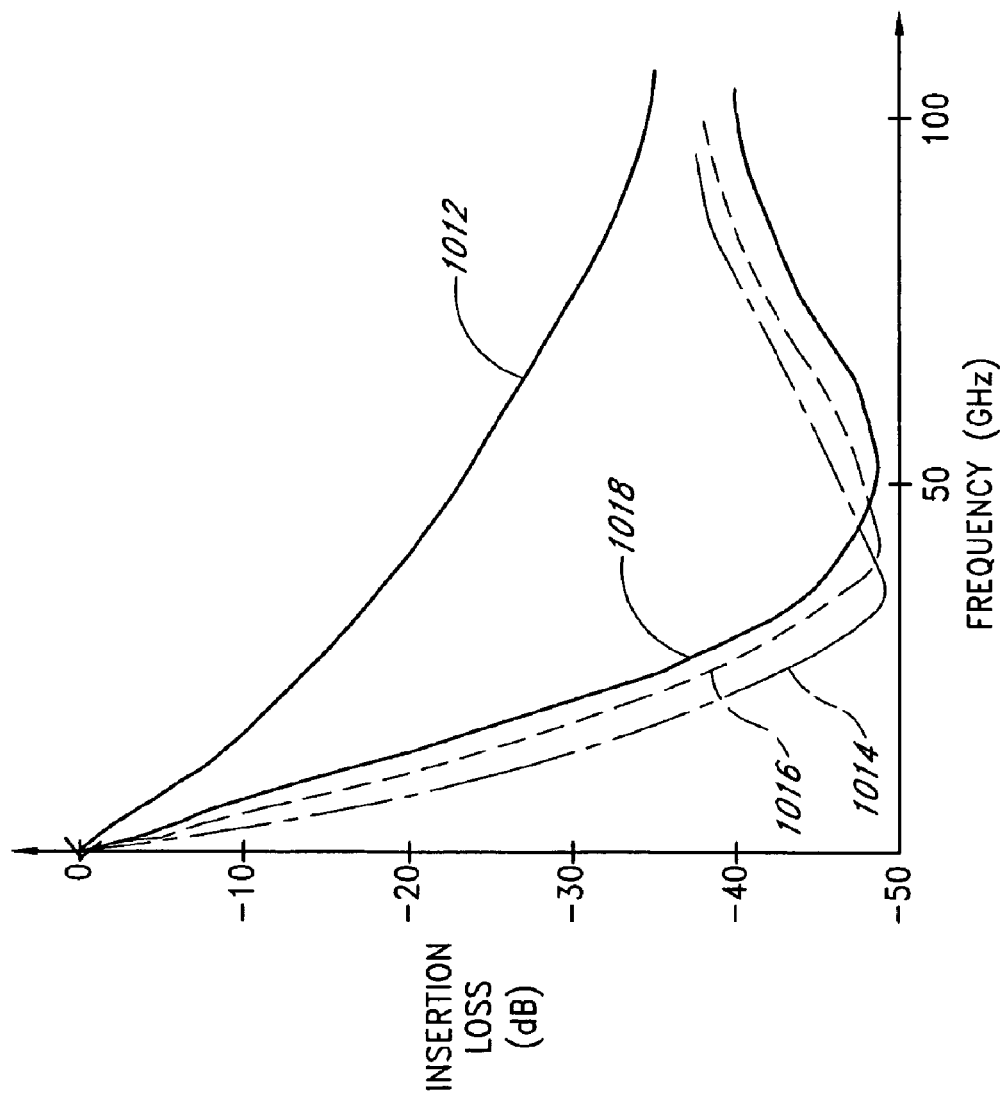
FIG. 10B illustrates an example of an expected insertion loss for an RF attenuator using a MEMS capacitor.

FIG. 10B illustrates an example of an expected insertion loss for an RF attenuator using a MEMS capacitor. The insertion loss corresponds to the reciprocal of the ratio of the signal power provided at an output terminal of an RF attenuator to the signal power provided as an input to an input terminal of an RF attenuator. For example, the input and the output terminals can be on opposing ends of a signal conductor as described earlier in connection with FIG. 9A. A horizontal axis indicates frequency, with increasing frequency to the right. A vertical axis indicates insertion loss in decibels.

A trace 1012 corresponds to an expected insertion loss for an RF attenuator with a MEMS capacitor with the mechanical conductor membrane 702 in a relatively low capacitance position illustrated, for example, in FIG. 7D. Other traces 1014, 1016, 1018 correspond to expected insertion losses for the RF attenuator when the mechanical conductor membrane 702 is in a relatively high capacitance position illustrated, for example, in FIG. 7E. The various traces 1014, 1016, 1018 correspond to expected insertion losses for varying amounts of capacitance. The corresponding capacitances for the trace 1014 is greater than the corresponding capacitance for the trace 1016, which in turn is greater than the corresponding capacitance for the trace 1018. Also, as illustrated by the example of FIG. 3B, as the capacitance of the RF attenuator is changed, the resonant frequency $f_0$ of the RF attenuator should also change, and the insertion loss will typically be affected. This permits the insertion loss of an RF attenuator with a MEMS capacitor to be selected according to an amount of capacitance actuated.

Figure 11:
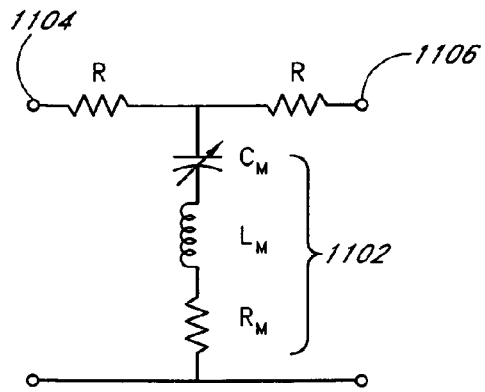
FIG. 11 illustrates an example of a MEMS capacitor in an RF attenuator.

For example, the resonant frequency $f_0$ of the RF attenuator is based at least in part on the capacitance of the MEMS capacitor. The RF attenuator can be modeled by an RLC circuit 1102 as illustrated in FIG. 11. For example, a first terminal 1104 can correspond to an input terminal for the RF attenuator. A second terminal 1106 can correspond to an output terminal. The first terminal 1104 and the second terminal 1106 can be at opposing ends of the signal conductor. Resistances R model the resistance of the signal conductor. The RLC circuit 1102 models the selectable capacitance to signal ground provided by the MEMS capacitor.

Variation in the capacitance of the RF attenuator correspondingly varies the resonant frequency $f_0$ of the RF attenuator. Accordingly, the resonant frequency of the variable attenuator can be controlled according to the control voltages for the MEMS capacitor applied to the RF attenuator. This permits, for example, an RF attenuator with a MEMS capacitor to be implemented as a tunable filter, wherein the resonant frequency of the filter can be modified or selected by a control circuit which controls one or more voltage levels applied to actuate one or more portions or membranes of the MEMS capacitor. In addition, one or more RF attenuators exhibiting different resonant frequencies can be implemented as a band pass or a notch filter.

Figure 12A:
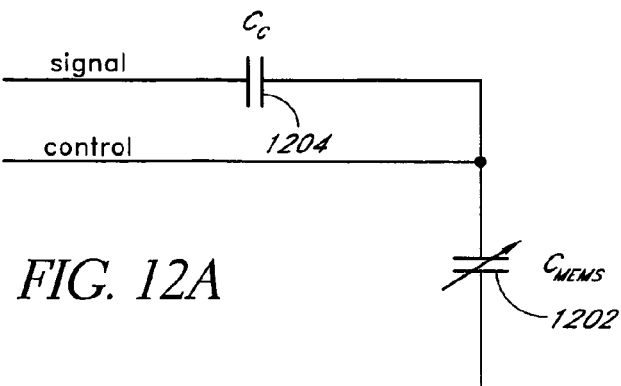
FIGS. 12A, 12B, and 12C illustrate examples of simplified equivalent circuits for a MEMS capacitor.
Figure 12B:
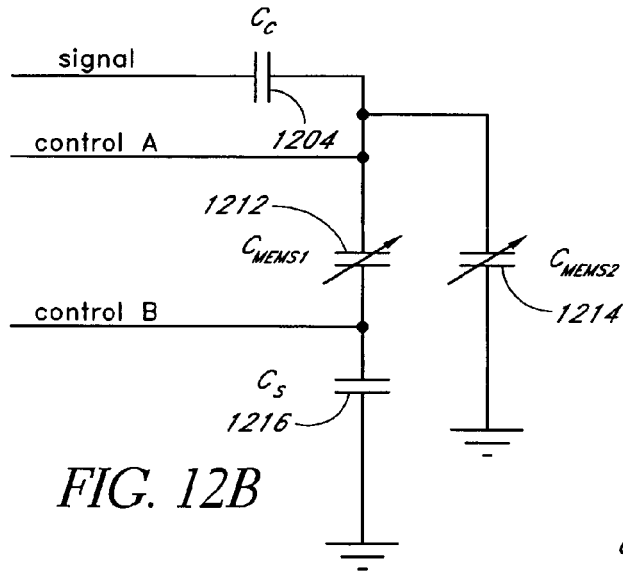
Figure 12C:
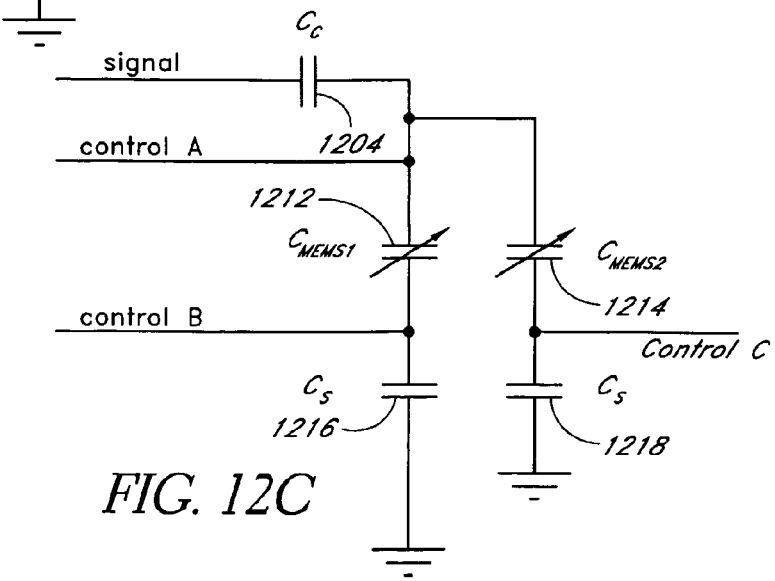

FIGS. 12A, 12B, and 12C illustrate examples of simplified equivalent circuits for a MEMS capacitor. The membrane of the MEMS capacitor $C_{MEMS}$ 1202 can be coupled to ground as illustrated in FIG. 12A. A control bias selectively controls the amount of capacitance of the MEMS capacitor $C_{MEMS}$ 1202 by selectively pulling in the membrane. One or more signals can be capacitively coupled via a coupling capacitor $C_C$ 1204 to the MEMS capacitor $C_{MEMS}$ 1202. It will be understood that the input signal and the output signal can be separately coupled to the MEMS capacitor $C_{MEMS}$ 1202.

FIG. 12B illustrates where at least one membrane of a MEMS capacitor is not directly coupled to a DC ground. This permits independent control of the membranes of a MEMS capacitor having a plurality of membranes. For example, the configuration described earlier in connection with FIG. 8A can be used to place a control bias on a membrane. A first membrane has a selectable capacitance $C_{MEMS1}$ 1212 which is at least partially controlled by a control bias on the signal conductor (control A) and a control bias on the membrane (control B). A capacitance $C_S$ 1216 can be used to provide a signal ground for the first membrane. Such that the capacitance $C_S$ 1216 should not significantly affect the series combination of capacitance to signal ground, it will be understood that the amount of the capacitance $C_S$ 1216 should be relatively high compared to the amount of capacitance selectable from the selectable capacitance $C_{MEMS1}$ 1212.

A second membrane has a selectable capacitance $C_{MEMS2}$ 1214. In the illustrated circuit, the second membrane is coupled to ground and actuation is controlled by the control bias on the signal conductor (control A). One or more coupling capacitors $C_C$ 1218 can again be used to isolate the control bias from the signals. In one embodiment, the signal flows through a signal conductor that is common to different membranes modeled by selectable capacitance $C_{MEMS1}$ 1212 and selectable capacitance $C_{MEMS2}$ 1214. The second membrane can also be independently biased (control C) and AC coupled to a signal ground via a coupling capacitor $C_S$ 1218 as illustrated in FIG. 12C. In addition, there can be additional membranes with independent control biases.

FIGS. 13A to 13I illustrate a process to fabricate a MEMS capacitor, such as the MEMS capacitor illustrated in FIGS. 7D and 7E. It will be appreciated by the skilled practitioner that the illustrated process can be modified in a variety of ways. Advantageously, semiconductor fabrication techniques can be used to fabricate the MEMS capacitor. For example, in another embodiment, various portions of the illustrated process can be combined, can be rearranged in an alternate sequence, can be removed, and the like.

Figure 13A:
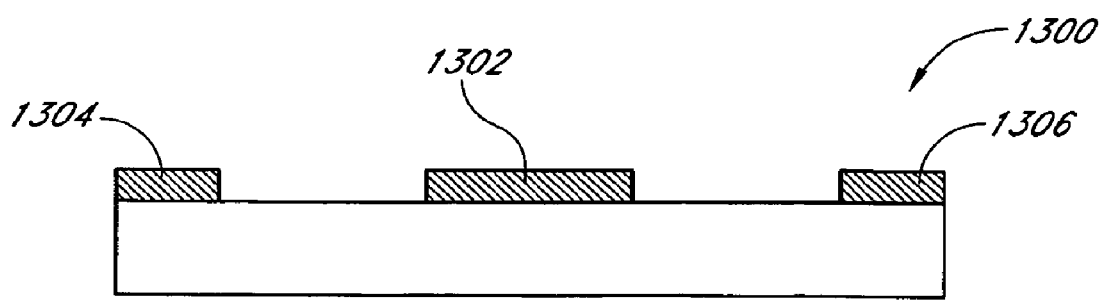
FIGS. 13A to 13I illustrate a process to fabricate a MEMS capacitor.

FIGS. 13A to 13I illustrates cross sections of a MEMS capacitor in various stages of fabrication. FIG. 13A illustrates a substrate assembly 1300 having conductive lines for the signal conductor 1302 and for voltage reference lines 1304, 1306 formed thereon. For example, the conductive lines can be formed by blanket deposition of a conductive material, such as aluminum, and by photoresist patterning and etching. In addition, where independent actuation of membranes is desired by separate control biases, at least one of the voltage reference lines 1304, 1306 can further be patterned into separate conductive lines.

Figure 13B:
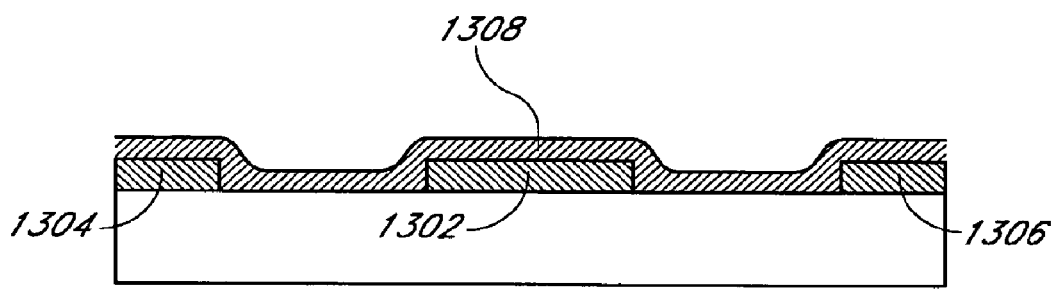
Figure 13C:
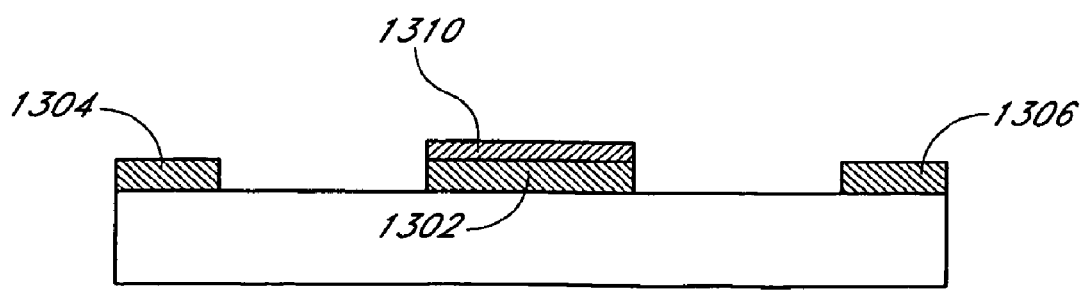

FIG. 13B illustrates forming an insulating layer 1308 on the substrate assembly 1300. The insulating layer 1308 can be formed from a variety of materials, such as silicon oxide, silicon nitride, aluminum oxide and the like. Photolithography techniques can be used to pattern the insulating layer 1308 to leave portions 1310 of the insulating layer behind where desired as shown in FIG. 13C. In FIG. 13C, the insulating layer is shown left on the signal conductor 1302. Where independent membrane actuation is desired, the insulating layer can also be left on at least some of the voltage reference lines.

Figure 13D:
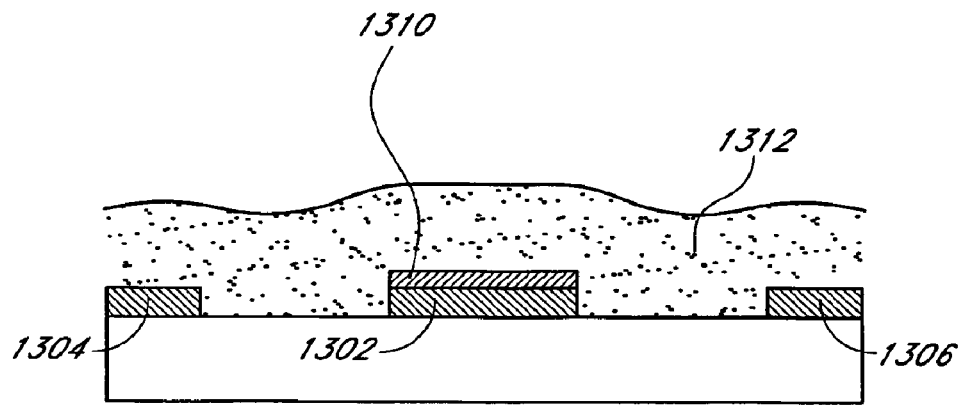
Figure 13E:
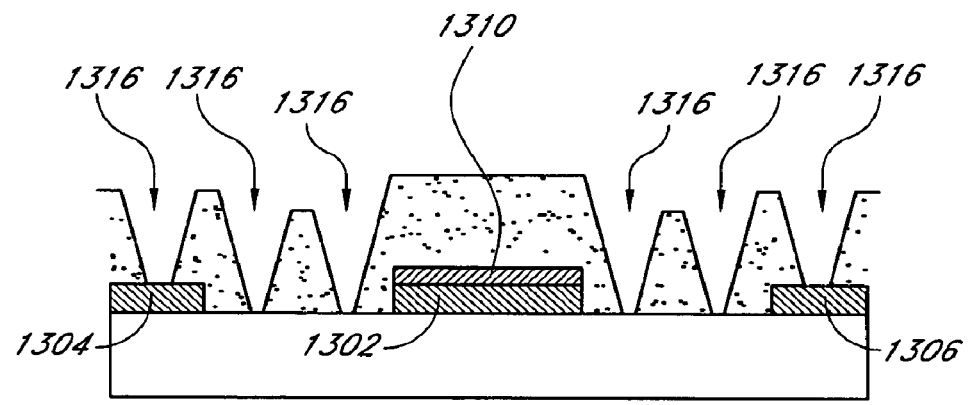

A blanket deposition of a sacrificial material 1312 is illustrated in FIG. 13D. This sacrificial material 1312 is eventually removed. Examples of sacrificial materials that are appropriate to use include silicon and molybdenum. Other materials will be readily determined by one of ordinary skill in the art. The sacrificial material 1312 is patterned for posts 1314 and for anchoring points 1316 for the membrane as shown in FIG. 13E.

Figure 13F:
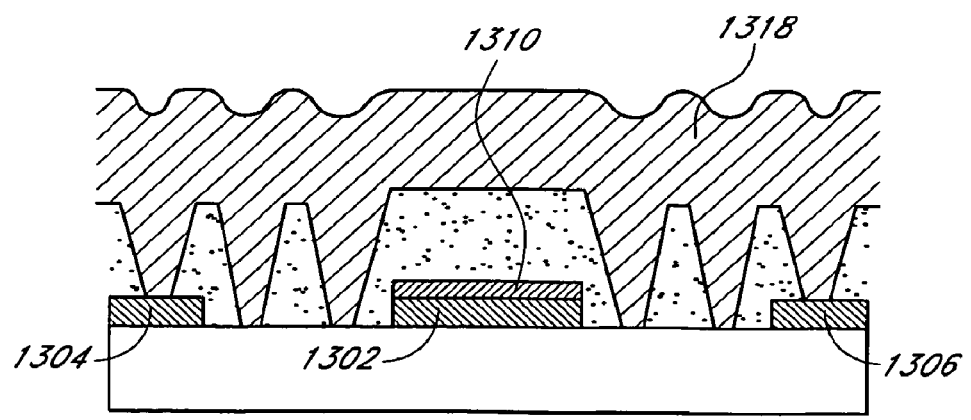
Figure 13G:
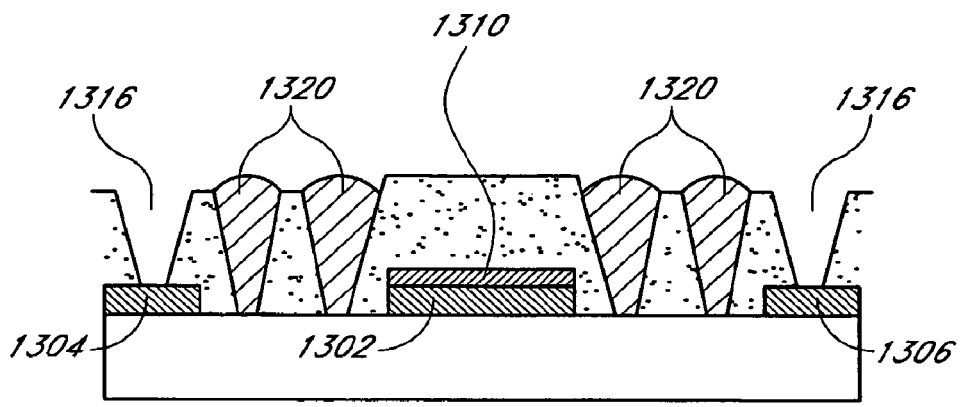

FIG. 13F illustrates a blanket deposition of a material 1318 for posts. For example, the posts can be made from a photosensitive polymer material, that is, photoresist. For example, the photosensitive polymer material can be patterned to form the posts by light exposure through a photo mask and chemical development. Accordingly, the post material 1318 is removed and/or reduced in thickness from selected areas. For example, FIG. 13G illustrates removal of the post material from the anchor points 1316 for the membrane. Optionally, a chemical mechanical polishing can be performed to provide a flatness to an upper surface of the posts 1320 and the sacrificial material (not shown).

Figure 13H:
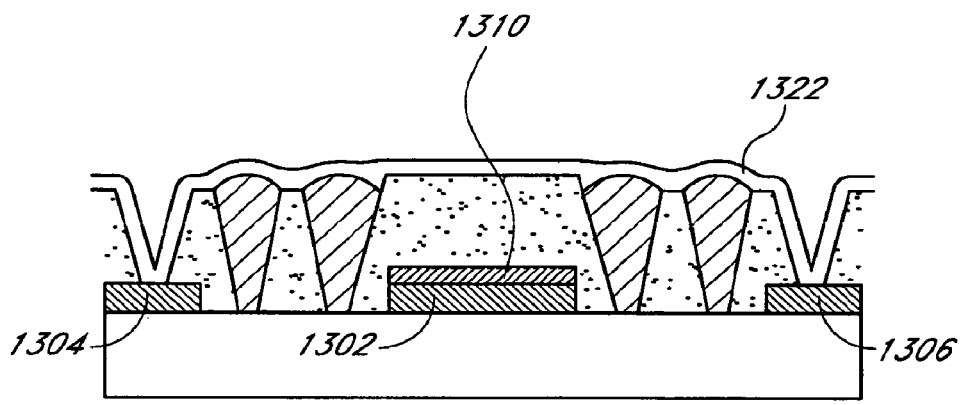
Figure 13I:
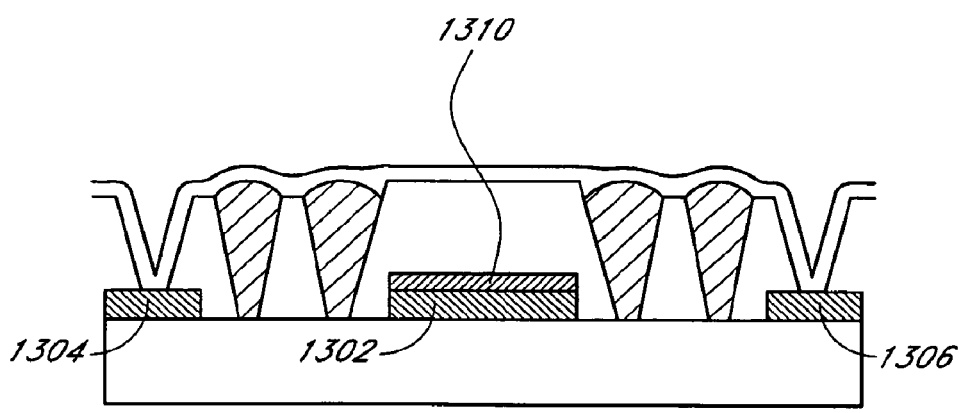

FIG. 13H illustrates blanket depositing of a material 1322 to form the mechanical conductive membrane. For example, aluminum can be deposited on the substrate assembly. The material 1322 can be patterned to form separate membranes and the like. In addition, relatively small holes can be patterned in the material 1322. These holes permit a gas etchant to access and remove remaining portions of the sacrificial material 1312 from underneath the membranes, resulting in the structure illustrated in FIG. 13I.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A voltage-controlled capacitor comprising:
a substrate assembly with an input terminal, a control terminal, and a voltage reference terminal;
voltage reference lines disposed on the substrate assembly, wherein at least one of the voltage reference lines is coupled to the voltage reference terminal;
a mechanical conductor membrane spaced above the substrate assembly and coupled directly or indirectly to one or more of the voltage reference lines at opposing ends of the mechanical conductor membrane so that the opposing mechanical conductor membrane is anchored at two or more ends and so that the mechanical conductor membrane is AC coupled to the one or more voltage reference lines, wherein at least a portion of the mechanical conductor membrane is movable to and from a first position a first distance from a surface of the substrate assembly and a second position a second distance from the surface of the substrate assembly;
one or more posts disposed between the substrate assembly and the mechanical conductor membrane and disposed between the two or more ends anchoring the mechanical conductor membrane, where the one or more posts support the mechanical conductor membrane;
a signal conductor disposed on the substrate assembly, where the signal conductor is DC coupled to the control terminal, wherein a voltage on the control terminal at least partially controls the position of the mechanical conductor membrane;
a layer of dielectric material disposed between a top surface of the signal conductor and the mechanical conductor membrane, where a gap exists between at least one of (a) the mechanical conductor membrane and the layer of dielectric material or (b) the layer of dielectric material and the signal conductor when the mechanical conductor membrane is in the first position, and substantially no gap exists when the mechanical conductor membrane is in the second position; and
a coupling capacitor with a first terminal and a second terminal, where the first terminal is coupled to the input terminal and where the second terminal is coupled to the signal conductor.

2. The capacitor as defined in claim 1 wherein the signal conductor comprises a non-transparent material.

3. The capacitor as defined in claim 1 wherein a material for the signal conductor comprises at least one of silver, copper, gold, aluminum, or combinations thereof.

4. The capacitor as defined in claim 1 wherein a material for the signal conductor has a resistivity of less than $1 \times 10^{-6}$ ohm-meters ($\Omega$-m).

5. The capacitor as defined in claim 1 wherein a material for the signal conductor has a resistivity of less than $0.1 \times 10^{-6}$ ohm-meters ($\Omega$-m).

6. The capacitor as defined in claim 1 wherein the layer of dielectric material is disposed directly on the top surface of the signal layer.

7. The capacitor as defined in claim 1, further comprising an insulator disposed between at least one end of the mechanical conductor membrane and a corresponding voltage reference line.

8. The capacitor as defined in claim 7 wherein the voltage reference line corresponds to a signal ground but is configured to have a DC bias.

9. The capacitor as defined in claim 1 wherein the voltage reference terminal is configured to be coupled to a signal ground reference.

10. The capacitor as defined in claim 1, further comprising an output terminal coupled to an opposite end of the signal conductor than the input terminal.

11. The capacitor as defined in claim 1, wherein the capacitor is embodied in an RF attenuator.

12. The capacitor as defined in claim 1, wherein the layer of dielectric material disposed between the top surface of the signal conductor and the mechanical conductor membrane has a thickness in the range of 0.1 to 0.5 micrometers.

13. The capacitor as defined in claim 1, wherein the signal conductor has a thickness in the range of 0.5 to 5 micrometers.

14. A capacitor having a selectable capacitance comprising:
a substrate assembly;
a signal conductor on the substrate assembly, wherein the signal conductor forms a first electrode for the capacitor;
a layer of dielectric material covering at least an upper surface of the signal conductor; and
one or more mechanical conductor membranes spaced above the substrate assembly such that the signal conductor is disposed between the substrate assembly and the one or more mechanical conductor membranes, where the one or more mechanical conductor membranes form a second electrode for the capacitor, wherein at least two or more portions of the one or more mechanical conductor membranes are at least partially independently movable from a low capacitance position and a high capacitance position such attainable positions include a low capacitance position for at least a selected two portions of the mechanical conductor membranes, a high capacitance position for the selected two portions of the mechanical conductor membranes, and an intermediate capacitance configuration in which one of the selected two portions is in the high capacitance position and the other is in the low capacitance position, wherein the selected position is at least partially determined by a voltage on the signal conductor.

15. The capacitor as defined in claim 14, wherein at least two or more portions correspond to a single continuous segment of the mechanical conductor membrane, and wherein the two or more portions differ by at least one of (a) a presence or absence of posts disposed between the substrate assembly and the segment of the mechanical conductor membrane, (b) a difference in height of posts, (c) a difference in spacing among posts, or (d) combinations thereof.

16. The capacitor as defined in claim 14, wherein at least two or more portions of the one or more mechanical conductor membranes correspond to separate segments of the mechanical conductor membrane forming a common electrode coupled to a signal ground, where the separate segments are DC isolated from another and coupled to separate biases for independent control of the separate segments.

17. The capacitor as defined in claim 14, wherein a plurality of signal conductors and a plurality of multiple segments of the mechanical conductor membranes are arranged in rows and columns.

* * * * *